Feb. 18, 1936.   H. SCHARLAU   2,031,073
DIRECTION FINDER COMPENSATOR FOR DIRECT READING OF TRUE BEARINGS
Filed March 28, 1932   2 Sheets-Sheet 1

INVENTOR
HANS SCHARLAU
BY *H. S. Grover*
ATTORNEY

Feb. 18, 1936.  H. SCHARLAU  2,031,073
DIRECTION FINDER COMPENSATOR FOR DIRECT READING OF TRUE BEARINGS
Filed March 28, 1932  2 Sheets-Sheet 2

INVENTOR
HANS SCHARLAU
BY *H. T. Grover*
ATTORNEY

Patented Feb. 18, 1936

2,031,073

UNITED STATES PATENT OFFICE 2,031,073

DIRECTION FINDER COMPENSATOR FOR DIRECT READING OF TRUE BEARINGS

Hans Scharlau, Berlin, Germany, assignor to Telefunken Gesellschaft für Drahtlose Telegraphie m. b. H., Berlin, Germany, a corporation of Germany Application March 28, 1932, Serial No. 601,573
In Germany April 14, 1931

5 Claims. (Cl. 250—11)

This invention relates to a direction finder and more particularly an improved mechanical compensator for reading directly the true bearings.

An object of this invention is to improve mechanical compensators employing oscillating pointers for reading in angles the true bearings of a radio direction finder.

It is known from practice that in direction finding the position of the direction-finder antenna or the goniometer wheel adjusted, for instance, to minimum signal strength, generally speaking does not give the true bearing angle, in other words, the direction of the radio beacon waves. As a matter of fact, certain influences are exerted by the surroundings of the direction-finding equipment, such as metallic parts or objects, especially the hull of the vessel, located or mounted near the direction-finder aerial. Because of re-radiation therefrom, another component is added to the beacon waves. This causes an apparent turning of the direction of the signal received in the direction finder. As a result, when setting the receiving loop to minimum signal strength, the course bearing $q$ thus ascertained must be corrected by a correction $f$ either in the positive or the negative sense in order to determine the true and accurate angle $p$.

In the accompanying drawings, Figs. 1–7 inclusive ilustrate and explain the various modifications of the invention.

Figure 1:
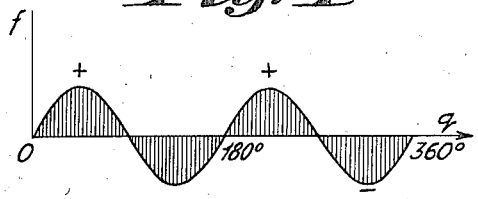

The corrective angle, as a general rule, is determined experimentally, most preferably by comparisons with the results of optical direction finding, and these figures are laid down in the form of tabulations or graphs. The dependence of the corrective angle $f$ (known as the goniometric error) upon the uncorrected bearing $q$ has roughly the form of a double-periodic curve as shown in Fig. 1.

In order to avoid the consultation of tabulations and graphs, and the addition of the corrective values, it has been suggested in the prior art to make the correction of the course bearing by mechanical means by inter-coupling the bearing indicator with the direction finder loop or wheel by way of a suitable gearing rather than directly so that upon turning the wheel the indicator hand will not move in proportion or synchronism with the latter, but rather with a certain variable lag or lead corresponding to the correction $f$.

Figure 2:
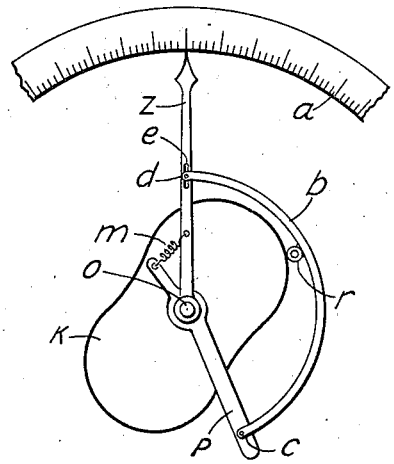

Such an arrangement known in the prior art is shown in Fig. 2. Referring to the same, P is an arm pivoted on $o$ and fixedly connected with the wheel (not shown in the drawings). Z is a pointer or index hand. $a$ is the scale. The hand Z is entrained by the arm P upon rotation of the latter, by the agency of a lever $b$ which at the end $c$ is rotatably supported in the arm P; at the other end a pin $d$ engages in a slot $e$ of the hand, while at its middle there is a roller $r$ which moves on the edge of a stationary guiding curve $k$. Contact pressure between $r$ and $k$ is insured by means of a spring $m$ tensioned between Z and a lug provided on P. Upon turning the wheel with arm P relatively to the stationary guide curve $k$ the radial distance between the roller $r$ and the pivot $o$ is varied, and there is thus varied also the angle between P and Z.

Figure 3:
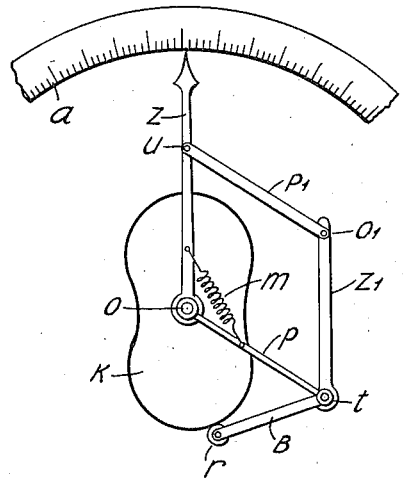

Another known arrangement is illustrated in Fig. 3. In this scheme the arm P is united with the index hand Z by means of a parallelogram gear. In this case the leg $Z_1$ of a bell crank lever pivoted on pin $t$ constitutes one side of the parallel drive gear, and the arm B of the bell crank at its ends supports the little wheel $r$ rolling on the fixed guide curve $k$. Also in this instance a certain shape of the said curve $k$ corresponds to and insures a definite inter-dependence between the correction angles $f$ and the angles of rotation $q$ of the goniometer wheel (uncorrected bearing).

The arrangements hereinbefore described, owing to the requisite transformation, involve the drawback that their indications will be found sufficiently correct only when the curve $k$ has been cut with very great accuracy, for even comparatively small departures or inaccuracies in contour compared to the ideal form are conducive to inadmissible errors in the indications of pointer Z.

Furthermore, the correction curve shown in Fig. 1 is subject to changes both for different frequencies or wave-lengths of the radio beacon as well as for different depths of the vessel.

It is desirable that the navigator should be enabled to use as far as feasible a complete set of different compensating cams $k$ corresponding to different depths and wave-lengths used in direction finding. What is also important is that such inaccuracies as are incurred in cutting the cams $k$ should not occasion unduly great influence upon the indications of the pointer Z, i. e., should not result in inadmissibly great errors.

For this purpose, according to the invention, in arrangements adapted to insure direct reading of bearing angles, and in which the indicator hand is driven from the direction-finder wheel through the intermediary of a parallelogram controlled by a rigid curve $k$ dispositions should be so made that the transmission ratio of the parallelogram gearing is approximately unity or larger than unity. Transmission of the parallelogram gear in the present sense and connection means the ratio between the virtual displacement of the guiding means of the parallelogram sliding along the rigid curve $k$ (such as the small wheel or roller $r$) and the corresponding displacement of the pointer Z over the scale or dial.

Figure 4:
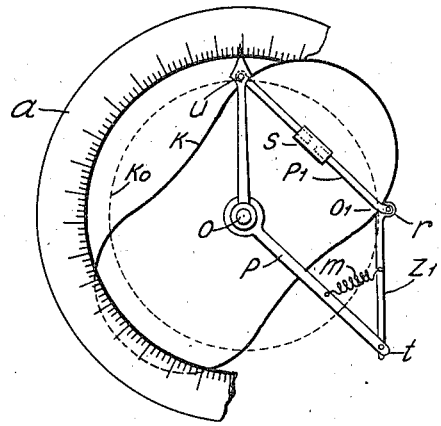

A disposition of this kind is shown schematically in Fig. 4. Contradistinct to the known arrangement of Fig. 3, the pivoting point $u$ is not located about the middle, but rather nearly at the end of the pointer Z. The roller $r$ is so supported on the rod $Z_1$ that its point of contact with the fixed guide curve $k$ is located as closely as possible to pivot $o$. S is a set nut by means of which the length of the parallelogram arm $P_1$ is balanced or equalized with the opposite side P.

Figure 5:
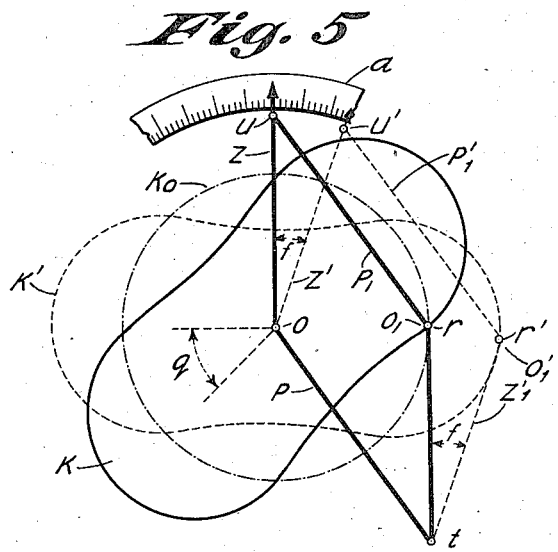
Figure 6:
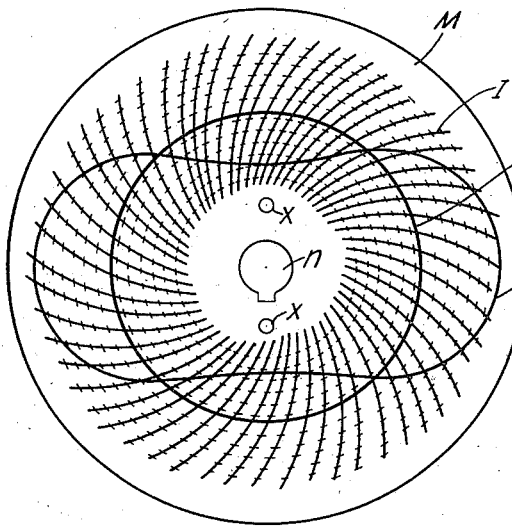

The kinematic conditions underlying this mechanism are explained in what follows by reference to Fig. 5. The different guide rods of the parallelogram gear are represented by straight lines, the assumption being made, and being closely fulfilled in practice, that the contact point between the roller $r$ and the fixed guide curve $k$ is located in the pivot $o_1$. The dimensions of roller $r$ have been neglected in the drawings. Hence, also in this scheme P is an arm pivoted about $o$ and in fixed connection with the goniometer wheel, while Z is the pointer.

The assumption is further made that in the presence of a definite bearing angle where the requisite correction is zero, the parallelogram gear occupies the position P—Z—$P_1$—$Z_1$. So far as the change of the angle between Z and P is concerned, all that counts is the relative alteration of the position of the goniometer loop in reference to the fixed curve $k$. For facilitating explanations it would also be feasible to consider the wheel with arm P as immobile, and the guide curve $k$ as pivoting about $o$. If the curve $k$ has the shape of the circle $k_0$, then, upon its rotation the distance $oo_1$ and thus also the shape of the whole parallelogram would not change. In other words, the latter would behave like a rigid body or structure, and the index hand would preserve its position relative to the wheel upon rotation of the latter. This covers the case where no correction is required. But if the guide curve has, say, a form $k$, and if upon rotation about an angle $q$ it changes into the position $k'$, then the sides $Z_1$ and $P_1$ and Z of the parallelogram will assume positions $Z'_1$, $P'_1$ and $Z'$, respectively. To the displacement $rr'$ of the roller there corresponds the displacement $uu'$ conformable thereto, of the indicator hand on the scale. The ratio of transmission of the parallelogram drive $$\frac{rr'}{uu'}$$

is essentially equal to unity. Hence, in case an inaccuracy of, say, from 0.1 to 0.2 mm. should have been incurred in the cutting of the curve $k$, this occasions an inaccuracy of similar amount in the reading of the pointer position, and this is still admissible.

Since the arc $uu'$ of the direction-finder scale should be equal to the requisite correction angle $f$, then the same or similar arc $rr'$ must measure the same correction angle $f$. This arc $rr'$ on the other hand, measures the departure of the point in question on the guide curve $k$ from the basic circuit $k_0$.

It can thus be seen in what way, on the basis of a correction table, the contour of the guide curve $k$ to be cut out of a circular sheet of metal may be marked thereon. Upon a circular piece of sheet metal (Fig. 7) there is traced the basic circle $k_0$ in some suitable manner, say, scratching, the graduations thereof to correspond to different angles $q$. Through these graduations passes a family of arcs $l$ the radius of which is equal to the length of $Z_1$, Fig. 5. Laid on these arcs are the positive or negative values of $f$ corresponding to particular values of the arc $rr'$, Fig. 5, as found from the error observation table. The positive values are laid off on the basic circle $k_0$ outwardly, and the negative ones inwardly. The connecting line between as large as possible a number of points marked in this manner results in the requisite contour of the guide curve $k$, and the latter is thereupon cut out of the sheet of metal with a maximum of precision. If the navigator has at his disposal a large set of circular metal sheets bearing curvilinear coordinates as in Fig. 6 he will be enabled to make therefrom an adequate number of different guide or corrector curves to correspond to different depths and radio beacon wave-lengths.

It is advantageous to make the arrangement so that the corrector curves $k$ can be substituted rapidly whenever requirements arise therefor. It is therefore preferable to make arrangements so that all parts of the equipment which are mounted above the guide or corrector curve $k$ can be readily demounted. The curve has a central opening $n$ through which the fixed vertical spindle or pin of the apparatus is passed, and two smaller openings $xx$ for the fastening screws whereby the curve can be screwed onto a suitable flange of the said central axis.

If mechanical corrections are to be dispensed with, or if observations to ascertain correction values $f'$ are to be made so as to create new conditions, say, for a different depth for which no observation values are as yet available, the pointer Z must be entrained in synchronism by the arm P. For this purpose there must be used either a guide curve whose shape coincides with that of the basic circle $k_0$, or else one works without any guide curve at all; but the parallelogram must then be rendered non-deformable by suitable fastening screws.

Figure 7:
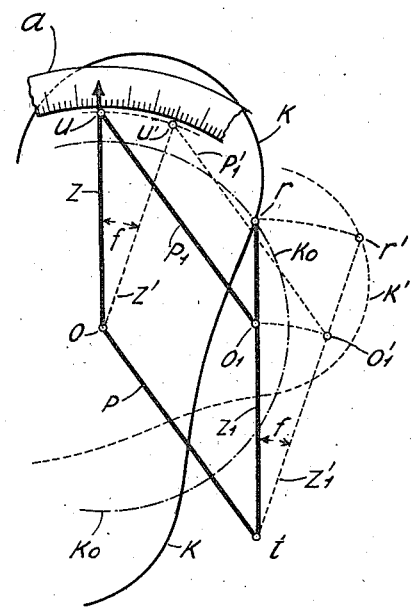

In the arrangement described by reference to Fig. 4 the ratio of transmission of the parallelogram gear, as stated previously, is approximately equal to 1. However, it is also possible to obtain a ratio being substantially larger than 1, for instance, if as shown in Fig. 7 the guide wheel $r$ is disposed not in the neighborhood of the pivotal point $o_1$, but upon the extension of the guide rod $Z_1$. In this case the ratio of transformation $$\frac{rr'}{uu'} = \frac{rr'}{o_1 o'_1}$$

is greater than 1.

In the case of a parallelogram drive, of course, the four guide rods or arms need not necessarily have a shape as shown and they need not necessarily be rectilinear. What is essential only is that the fulcrums $o$, $t$, $o_1$, $u$ are located at the corners of a parallelogram.

I claim:—

1. A direction finder mechanical compensator for the direct reading of the true bearings comprising a scale, an indicator pivotally located at the center of said scale for reading the bearings of said scale, a replaceable cam having a periphery for providing the corrections necessary to secure direct readings of the true bearings, a parallelogram drive having arms, one of said arms joined to said indicator, a roller pivotally located at an extended portion of one of said arms, said roller adapted to revolve on the periphery of said cam, the relationship between the virtual displacement angle of the cam and the parallelogram drive, and the corresponding displacement angle of the indicator upon the scale having a greater angular ratio than 1 to 1.

2. A direction finder mechanical compensator for the direct reading of the true bearings comprising a scale, an indicator pivotally located at the center of said scale for reading the bearings of said scale, a replaceable cam having a periphery for providing the corrections necessary to secure direct readings of the true bearings, a parallelogram drive one of the arms of said parallelogram drive having adjustable means comprising adjustable members said arm joined to said indicator, and a roller pivotally located at the end of said adjustable arm and adapted to revolve on the outside of said cam, and a tension spring for securing said roller in contact with the outside periphery of said cam, and a pivot point joining said parallelogram drive with said indicator.

3. A direction finder mechanical compensator for the direct reading of true bearings, said compensator comprising a scale, an indicator pivotally located at the center of said scale for reading the true bearings on the scale, a replaceable cam having a contour characteristic of the reading of the true bearings, said cam being rotatable around the center of said scale, a lever system comprising four arms linked together forming a closed parallelogram drive at least one arm of which forms said indicator, a pivot for said lever system, said pivot being located at the center of said scale, a roller pivotally fixed at substantially the ends of the pivot points of two of said arms and adapted to follow the contour of said cam when said system is moved around its pivot, another arm of said lever system pivotally fixed at substantially the end of said indicator arm the relationship between the roller and the virtual displacement of the indicator arm being equal to unity.

4. A direction finder mechanical compensator for the direct reading of true bearings, said compensator comprising a scale, an indicator pivotally located at the center of said scale for reading the true bearings on the scale, a replaceable cam having a contour characteristic of the reading of the true bearings, said cam being rotatable around the center of said scale, a lever system comprising four arms linked together forming a closed parallelogram drive at least one arm of which forms said indicator, a pivot for said lever system, said pivot being located at the center of said scale, a roller pivotally fixed to one of said arms, a tension spring stretched between two of the adjacent arms so that said roller will be in contact with said cam and follow the contour of said cam when said system is moved around its pivot, another arm of said lever system pivotally fixed at substantially the end of said indicator arm.

5. A direction finder mechanical compensator for the direct reading of true bearings, said compensator comprising a scale, an indicator pivotally located at the center of said scale for reading the true bearings on the scale, a replaceable cam having a contour characteristic of the reading of the true bearings, said cam being rotatable around the center of said scale; a lever system comprising four arms linked together to form a closed parallelogram drive, one of said arms comprising said indicator, a second arm pivotally attached to the same pivot point as said indicator, a third arm linked to said second arm, and a fourth arm linked to said third arm and said indicator; an adjusting member to alter the length of said fourth arm, a roller located at the pivot point of said third and fourth arms, and a tension spring stretched between adjacent arms so that said roller will be in contact and follow the contour of said cam when said system is moved around its pivot; another arm of said lever system being pivotally fixed to said indicator.

HANS SCHARLAU.